(12) United States Patent  
Aoyagi et al.

(10) Patent No.: US 9,404,003 B2  
(45) Date of Patent: *Aug. 2, 2016

(54) POLYAMINE CURABLE, HIGHLY SATURATED NITRILE RUBBER COMPOSITION

(71) Applicant: NOK Corporation, Tokyo (JP)

(72) Inventors: Ayako Aoyagi, Kanagawa (JP); Kenichi Uchida, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/400,486

(22) PCT Filed: Apr. 5, 2013

(86) PCT No.: PCT/JP2013/060501  
§ 371 (c)(1),  
(2) Date: Nov. 11, 2014

(87) PCT Pub. No.: WO2013/175877  
PCT Pub. Date: Nov. 28, 2013

(65) Prior Publication Data  
US 2015/0166811 A1 Jun. 18, 2015

(30) Foreign Application Priority Data

May 24, 2012 (JP) ................. 2012-118192

(51) Int. Cl.
| | | |
|---|---|---|
| C08L 9/02 | (2006.01) | |
| C08L 71/02 | (2006.01) | |
| C09K 3/10 | (2006.01) | |
| F16J 15/10 | (2006.01) | |
| C09D 109/02 | (2006.01) | |
| C08K 5/17 | (2006.01) | |
| C08K 5/544 | (2006.01) | |
| C08L 15/00 | (2006.01) | |

(52) U.S. Cl.  
CPC .............. *C09D 109/02* (2013.01); *C08K 5/17* (2013.01); *C08K 5/544* (2013.01); *C08L 15/005* (2013.01); *C08L 71/02* (2013.01); *C09K 3/10* (2013.01); *F16J 15/102* (2013.01); *C09K 2200/0612* (2013.01)

(58) Field of Classification Search  
CPC .............. C09K 3/10; F16J 15/10; C08L 9/02; C08L 71/02  
USPC ........................................ 524/308  
See application file for complete search history.

(56) References Cited

U.S. PATENT DOCUMENTS

| | | |
|---|---|---|
| 5,730,762 A | 3/1998 | Murakami et al. |
| 6,207,752 B1 * | 3/2001 | Abraham ............ C08K 5/353 |
| | | 525/125 |
| 8,372,918 B2 * | 2/2013 | Iizuka ................. C08C 19/02 |
| | | 525/328.9 |
| 2007/0142510 A1 | 6/2007 | Ono et al. |
| 2009/0062444 A1 | 3/2009 | Moritani |
| 2009/0062445 A1 | 3/2009 | Moritani |
| 2010/0029857 A1 | 2/2010 | Soddemann et al. |
| 2010/0113710 A1 | 5/2010 | Horikoshi et al. |
| 2010/0168302 A1 | 7/2010 | Nagamori et al. |
| 2012/0172509 A1 | 7/2012 | Nagamori et al. |
| 2013/0102725 A1 | 4/2013 | Nagamori et al. |
| 2014/0296404 A1 | 10/2014 | Nagamori et al. |

FOREIGN PATENT DOCUMENTS

| | | |
|---|---|---|
| CN | 101331183 A | 12/2008 |
| CN | 101384661 A | 3/2009 |
| EP | 2 392 599 A1 | 12/2011 |
| JP | 9-3246 | 1/1997 |
| JP | 9-40975 | 2/1997 |
| JP | 11-50067 | 2/1999 |
| JP | 2000-17118 A | 1/2000 |
| JP | 2001-288303 A | 10/2001 |
| JP | 2003-82161 A | 3/2003 |
| JP | 2003-317544 | 11/2003 |
| JP | 2003-342422 A | 12/2003 |
| JP | 2005-281433 A | 10/2005 |
| JP | 2008-179671 | 8/2008 |
| JP | 2008-195881 A | 8/2008 |
| JP | 2010-24452 A | 2/2010 |
| JP | 2010-106113 A | 5/2010 |
| JP | 2012-057111 | 3/2012 |
| JP | 2012-214535 A | 11/2012 |
| KR | 2012-000869 A | 2/2012 |
| WO | WO 2005/103143 A1 | 11/2005 |
| WO | WO 2007/094158 A1 | 8/2007 |
| WO | WO 2007/094447 A1 | 8/2007 |
| WO | WO 2008/038465 A1 | 4/2008 |
| WO | WO 2013/175877 A1 | 11/2013 |

OTHER PUBLICATIONS

Product Information for Uniplex 809 by Lanxess, Feb. 2013.*

(Continued)

*Primary Examiner* — Vu A Nguyen  
(74) *Attorney, Agent, or Firm* — Brinks Gilson & Lione

(57) ABSTRACT

A polyamine curable, highly saturated nitrile rubber composition comprising 100 parts by weight of a polyamine curable, highly saturated nitrile rubber having an $\alpha,\beta$-ethylenically unsaturated nitrile monomer unit, a diene-based monomer unit, an $\alpha,\beta$-ethylenically unsaturated dicarboxylic acid monoester monomer unit, and an $\alpha,\beta$-ethylenically unsaturated carboxylic acid ester monomer unit other than the $\alpha,\beta$-ethylenically unsaturated dicarboxylic acid monoester monomer unit, and having an $\alpha,\beta$-ethylenically unsaturated nitrile monomer unit content of 22.0 to 24.5 wt. %, preferably 22.5 to 24.5 wt. %, and an iodine value of 120 or less, and 4 to 31 parts by weight of an aliphatic carboxylic acid diester compound of polyalkylene glycol. The polyamine curable, highly saturated nitrile rubber composition is used as a cure molding material of a sealing material that can be suitably used even in an environment in which the sealing material is exposed to polycyclic aromatic compound.

6 Claims, No Drawings

(56) References Cited

OTHER PUBLICATIONS

International Programme on Chemical Safety, "Selected Non-Heterocyclic Policyclic Aromatic Hydrocarbons", United Nations Environment Programme International Labour Organisation World Heath Organization, Environmental Health Criteria No. 202, Feb. 7, 1998 (2 pgs).

International Search Report from corresponding PCT application No. PCT/JP2013/060501 dated May 14, 2013 (5 pgs).

International Preliminary Report on Patentability from corresponding PCT application No. PCT/JP2013/060501 dated Nov. 25, 2014 (6 pgs).

* cited by examiner

POLYAMINE CURABLE, HIGHLY SATURATED NITRILE RUBBER COMPOSITION

RELATED APPLICATION

This application is a 35 U.S.C. §371 national phase filing of International Patent Application No. PCT/JP2013/060501, filed Apr. 5, 2013, through which and to which priority is claimed under 35 U.S.C. §119 to Japanese Patent Application No. 2012-118192, filed May 24, 2012.

TECHNICAL FIELD

The present invention relates to a polyamine curable, highly saturated nitrile rubber composition. More particularly, the present invention relates to a polyamine curable, highly saturated nitrile rubber composition used as a cure molding material of a sealing material, etc., that can be suitably used even in an environment in which the sealing material is exposed to polycyclic aromatic compound.

BACKGROUND ART

Characteristics such as oil resistance, heat resistance, cold resistance, and the like are required for the application of intake manifold gaskets. For this reason, fluororubber, NBR, silicone rubber, etc., are used as cure molding materials for such gaskets. Among these cure molding materials, fluororubber has problems in low-temperature properties and cost, silicone rubber has a problem that it is easily hydrolyzed, and NBR has a problem in that it is not suitable for sealing applications in high-temperature environments because of its extremely poor compression set characteristics.

It has been revealed that polycyclic aromatic compounds having two or more benzene rings or derivatives thereof enter into parts in which sealing materials for fuel oil are used, and adversely affect the sealing materials.

Conventionally, it was considered that polycyclic aromatic compounds adversely affected only diesel fuel automobiles using fuel having a high-boiling fraction (e.g., light oil); however, it has been recently revealed that polycyclic aromatic compounds also adversely affect automobiles using other fuel, such as gasoline fuel automobiles. A reason for this is that fuel made from crude oil that has been insufficiently refined during the production thereof may possibly be on the market and sold.

Moreover, polycyclic aromatic compounds are known to be generated during incomplete combustion of organic compounds. Various polycyclic aromatic compounds are discharged as exhaust gas. For example, exhaust gas comprising naphthalene, acenaphthene, etc., as main components is discharged from diesel fuel automobiles, and exhaust gas comprising fluoranthene, pyrene, etc., as main components is discharged from gasoline fuel automobiles (see Non-Patent Document 1). That is, there is a possibility that when automotive fuel is blown back to a part in which a sealing material is used, the sealing material is exposed to polycyclic aromatic compounds generated by combustion.

Furthermore, in order to increase the lubricity of fuel, techniques of adding polycyclic aromatic compounds, such as bicyclic aromatic compounds (e.g., naphthalene, acenaphthene, fluorene, or alkyl-substituted products thereof) and tricyclic or higher cyclic aromatic compounds (e.g., anthracene, phenanthrene, or alkyl-substituted products thereof), to fuel oil are known (see Patent Documents 1 and 2). There is a possibility that polycyclic aromatic compounds are contained as additives.

Thus, regardless of the type of fuel, it seems highly possible that sealing materials for fuel oil are exposed to polycyclic aromatic compounds.

Hydrogenated NBR, which has excellent balance of oil resistance, low-temperature properties, and cost, has been suitably used as a sealing material for general fuel oil applications. However, hydrogenated NBR is crystallized in contact with polycyclic aromatic compounds in fuel oil and thereby hardened, which causes a new problem of reducing sealing performance. In order to solve this problem of hydrogenated NBR, there is a method of reducing the acrylonitrile content of hydrogenated NBR. However, hydrogenated NBR with a low acrylonitrile content has poor oil resistance, and is thus not suitable for use in parts that are often exposed to fuel oil. In contrast, hydrogenated NBR with a high acrylonitrile content is often hardened with polycyclic aromatic compounds, and a significant reduction in sealing performance is inevitable.

PRIOR ART DOCUMENTS

Patent Documents

Patent Document 1: JP-A-H11-50067
Patent Document 2: JP-A-H9-40975
Patent Document 3: JP-A-2008-179671
Patent Document 4: JP-A-2010-106113
Patent Document 5: WO 2005/103143
Patent Document 6: WO 2008/038465

Non-Patent Document

Non-Patent Document 1: Environmental Health Criteria, No. 202 (1998)

OUTLINE OF THE INVENTION

Problem to be Solved by the Invention

An object of the present invention is to provide a polyamine curable, highly saturated nitrile rubber composition used as a cure molding material of a sealing material, etc., that is resistant to hardening caused by polycyclic aromatic compounds and that is used as a cure molding material of a sealing material, etc., that can be suitably used even in an environment in which the sealing material is exposed to polycyclic aromatic compound for some reasons.

Means for Solving the Problem

The above object of the present invention can be achieved by a polyamine curable, highly saturated nitrile rubber composition comprising 100 parts by weight of a polyamine curable, highly saturated nitrile rubber having an α,β-ethylenically unsaturated nitrile monomer unit, a diene-based monomer unit, an α,β-ethylenically unsaturated dicarboxylic acid monoester monomer unit, and an α,β-ethylenically unsaturated carboxylic acid ester monomer unit other than the α,β-ethylenically unsaturated dicarboxylic acid monoester monomer unit, and having an α,β-ethylenically unsaturated nitrile monomer unit content of 22.0 to 24.5 wt. %, preferably 22.5 to 24.5 wt. %, and an iodine value of 120 or less, and 4 to 31 parts by weight of an aliphatic carboxylic acid diester compound of polyalkylene glycol.

Effect of the Invention

When polyamine curable, highly saturated nitrile rubber having an α,β-ethylenically unsaturated nitrile monomer unit, a diene-based monomer unit, and an α,β-ethylenically unsaturated dicarboxylic acid monoester monomer unit, as well as an α,β-ethylenically unsaturated carboxylic acid ester monomer unit other than the α,β-ethylenically unsaturated dicarboxylic acid monoester monomer unit is used as a cure molding material of a sealing material for polycyclic aromatic compound-containing fuel oil, the polyamine curable, highly saturated nitrile rubber composition of the present invention can effectively prevent crystallization of the nitrile rubber polymer caused by polycyclic aromatic compounds; thus, resistance to hardening caused by polycyclic aromatic hydrocarbons is exhibited. That is, a nitrile rubber sealing material, the swelling of which caused by fuel oil remains at a practical use level even under circumstances in which fuel oil is vaporized and crystallization of the polymer by polycyclic aromatic compounds is promoted, is formed. Therefore, when the sealing material is used as an intake manifold gasket, or the like, the reduction in the sealing performance as a sealing material, etc., can be effectively prevented.

EMBODIMENTS FOR CARRYING OUT THE INVENTION

Polyamine curable, highly saturated nitrile rubber having an α,β-ethylenically unsaturated nitrile monomer unit, a diene-based monomer unit, an α,β-ethylenically unsaturated dicarboxylic acid monoester monomer unit, and optionally an α,β-ethylenically unsaturated carboxylic acid ester monomer unit other than the α,β-ethylenically unsaturated dicarboxylic acid monoester monomer unit; having an α,β-ethylenically unsaturated nitrile monomer unit content of 10 to 60 wt. %, preferably 15 to 55 wt. %, particularly preferably 20 to 50 wt. %, for example, 34 wt. %; and having an iodine value of 120 or less is disclosed, for example, in Patent Documents 3 and 4.

The α,β-ethylenically unsaturated nitrile monomer unit is not particularly limited, as long as it is an α,β-ethylenically unsaturated compound having a nitrile group. Examples thereof include acrylonitrile, α-halogenoacrylonitrile having a chloro group or a bromo group at its α-position, methacrylonitrile having an alkyl group at its α-position, and the like; preferably acrylonitrile or methacrylonitrile is used.

In the present invention, the ratio of the α,β-ethylenically unsaturated nitrile monomer unit is 22.0 to 24.5 wt. %, preferably 22.5 to 24.5 wt. %, more preferably 23.0 to 24.5 wt. %, in the polyamine curable, highly saturated nitrile rubber. Moreover, in the plasticizer blending ratio described later, the nitrile content of the polyamine curable, highly saturated nitrile rubber used tends to affect the effect of improving polycyclic aromatic compound-containing fuel oil resistance (polyaromatic compound-caused hardening resistance); thus, the ratio of the α,β-ethylenically unsaturated nitrile monomer unit is defined as described above.

The diene-based monomer unit is derived from a $C_4$-$C_{12}$ conjugated or non-conjugated diene monomer, such as 1,3-butadiene, isoprene, 2,3-dimethyl-1,3-butadiene, 1,3-pentadiene, 1,4-pentadiene, or 1,4-hexadiene; preferably a conjugated diene monomer; more preferably 1,3-butadiene.

Such a diene-based monomer unit can be used in combination with, as an optional component, a $C_2$-$C_{12}$ α-olefin-based monomer unit, such as ethylene, propylene, 1-butene, 4-methyl-1-pentene, 1-hexene, or 1-octene.

The ratio of the diene-based monomer unit, or the diene-based monomer unit and the α-olefin-based monomer unit is 20 to 77.8 wt. %, preferably 30 to 77.2 wt. %, more preferably 40 to 76.4 wt. %, in the polyamine curable nitrile rubber. When the ratio of the diene-based monomer unit, etc., is less than this range, the rubber elasticity of the rubber curing product may be reduced; whereas when the ratio is overly large, heat resistance and chemical resistance stability may be impaired.

Examples of the α,β-ethylenically unsaturated dicarboxylic acid monoester monomer unit include $C_1$-$C_{10}$, preferably $C_2$-$C_6$, monoalkyl esters, $C_5$-$C_{12}$, preferably $C_6$-$C_{10}$, monocycloalkyl esters, $C_6$-$C_{12}$, preferably $C_7$-$C_{10}$, mono(alkyl-substituted cycloalkyl)esters, etc., of maleic acid, fumaric acid, citraconic acid, itaconic acid, or the like; more preferably monopropyl esters or mono-n-butyl esters of maleic acid, fumaric acid, or citraconic acid; particularly preferably maleic acid mono-n-butyl esters.

The ratio of such an α,β-ethylenically unsaturated dicarboxylic acid monoester monomer unit is 0.1 to 20 wt. %, more preferably 0.2 to 15 wt. %, particularly preferably 0.5 to 10 wt. %, in the polyamine curable nitrile rubber. When the ratio of the α,β-ethylenically unsaturated dicarboxylic acid monoester monomer unit is less than this range, carboxyl groups necessary for amine cure become insufficient, and the tensile stress of the curing product decreases; whereas when the ratio is greater than this range, deterioration of the scorch stability of the curable nitrile rubber composition and decrease in the fatigue resistance of the curing product, etc., occur.

In the present invention, polyamine curable, highly saturated nitrile rubber having, in addition to an α,β-ethylenically unsaturated dicarboxylic acid monoester monomer unit, an α,β-ethylenically unsaturated carboxylic acid ester monomer unit other than the α,β-ethylenically unsaturated dicarboxylic acid monoester monomer is used. Such a monomer unit is, for example, at least one member of a (meth)acrylic acid alkyl ester monomer unit having a $C_1$-$C_8$ alkyl group, a (meth)acrylic acid alkoxyalkyl ester monomer unit having a $C_2$-$C_8$ alkoxyalkyl group, and a diester monomer unit corresponding to the above α,β-ethylenically unsaturated dicarboxylic acid monoester monomer unit. Due to the presence of this monomer unit, resistance to polycyclic aromatic compounds contained in fuel oil is effectively exhibited. This can effectively prevent crystallization of the polymer, and effectively suppress an increase in the hardness of the surface of cure molded articles.

Such α,β-ethylenically unsaturated carboxylic acid ester monomer units are used at a ratio of 30 wt. % or less, preferably 20 wt. % or less, particularly preferably 0.1 to 10 wt. %, in the polyamine curable, highly saturated nitrile rubber.

Examples of the polyamine curable, highly saturated nitrile rubber comprising these monomer units include those having an iodine value of 120 or less, preferably 80 or less, more preferably 25 or less, particularly preferably 15 or less. When polyamine curable, highly saturated nitrile rubber having an iodine value, which indicates the reduction in the degree of saturation by hydrogenation, of greater than this range is used, the ozone resistance of the curing product is impaired.

Polyamine curable, highly saturated nitrile rubber having the above monomer units, i.e., an unsaturated nitrile monomer unit, a diene-based monomer unit, an α,β-ethylenically unsaturated dicarboxylic acid monoester monomer unit, and an α,β-ethylenically unsaturated carboxylic acid ester monomer unit other than the α,β-ethylenically unsaturated dicarboxylic acid monoester monomer unit, as essential monomer units, and having an iodine value of 120 or less is expressed by an abbreviation [XHNBR]. Further, polyamine curable, highly saturated nitrile rubber in which other α,β-ethylenically unsaturated carboxylic acid ester monomer unit is not copolymerized is also expressed by the abbreviation [XHNBR]. Practically, commercial products can be used as they are. For example, as the former polyamine curable, highly saturated nitrile rubber comprising a quaternary polymer, Zetpol 3700, Zetpol 3610 (produced by Zeon Corporation), or the like can be used as they are and as the latter polyamine curable, highly saturated nitrile rubber comprising a ternary polymer Zetpol 2510 (produced by Zeon Corporation) or the like can be used as they are.

The polyamine curable, highly saturated nitrile rubber is cured by a polyamine compound curing agent, such as one disclosed in Patent Document 5. Examples of polyvalent amine compounds include aliphatic diamines, such as hexamethylenediamine, and carbamate, benzoate, or cinnamaldehyde adducts thereof, and diamino-modified siloxane; alicyclic diamines, such as 4,4'-methylenebiscyclohexylamine or cinnamaldehyde adducts thereof, and bis(4-amino-3-methyldicyclohexyl)methane; aromatic diamines, such as 4,4'-methylenedianiline, p,p'-ethylenedianiline, m- or p-phenylenediamine, 3,4'-diaminodiphenylether, 4,4'-diaminodiphenylether, 4,4'-diaminodiphenylsulfone, 4,4'-(m- or p-phenylenediisopropylidene)dianiline, 2,2-bis[4-(4-aminophenoxyl)phenyl]propane, 2,2-bis[4-(3-aminophenoxyl)phenyl]propane, bis[4-(4-aminophenoxyl)phenyl]sulfone, bis[4-(3-aminophenoxyl)phenyl]sulfone, 4,4'-bis(4-aminophenoxy)biphenol, bis[4-(4-aminophenoxyl)phenyl]ether, 2,2-bis[4-(4-aminophenoxyl)phenyl]hexafluoropropane, 1,4-bis(4-aminophenoxy)benzene, and 1,3-bis(4-aminophenoxy)benzene; preferably aromatic diamines, more preferably p-substituted aromatic diamines, are used. Such a polyvalent amine compound curing agent is used at a ratio of about 0.1 to 5 parts by weight, preferably about 0.2 to 4 parts by weight, based on 100 parts by weight of the XHNBR quaternary polymer. When the ratio of the curing agent is less than this range, cure is insufficient, and sufficient compression set characteristics are not obtained.

In order to improve the compression set characteristics of the XHNBR quaternary polymer, a method that uses a 1,8-diazabicyclo[5.4.0]undecene-7 (salt) or 1,5-diazabicyclo[4.3.0]nonene (salt) curing accelerator in combination with a diamine compound curing agent, a method that further uses mercaptobenzimidazoles in addition to the above curing system, a method that uses an aromatic diamine compound curing agent and a guanidine compound curing aid in combination, a method that further uses a benzothiazolylsulfenamide-based compound curing accelerator in combination with the above curing system, or other method is appropriately employed.

To the XHNBR quaternary polymer, an aliphatic carboxylic acid diester compound of polyalkylene glycol represented by the general formula:

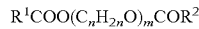

R$^1$, R$^2$: each independently a C$_1$-C$_{14}$ alkyl group or an alkenyl group
n: an integer of 2 to 4
m: an integer of 2 to 30
is added as a plasticizer.

Such aliphatic carboxylic acid diester compounds of polyalkylene glycol are disclosed in Patent Document 6, which refers to the following compounds as examples thereof. The compound names are followed by trade names of the corresponding commercial products in parenthesis. Note that polyethylene glycol is abbreviated as PEG, polypropylene glycol is abbreviated as PPG, and polytetramethylene glycol is abbreviated as PTMG.

PEG (MW200) diheptanoate
PEG (MW300) di-2-ethylhexanoate (RS700, produced by Adeka Corporation)
PEG (MW600) di-2-ethylhexanoate (RS735, produced by Adeka Corporation)
PEG (MW1000) didecanoate
PEG (MW300) didecanoate
PEG (MW600) heptanoate/dodecanoate (equivalent mixture)
PPG (MW400) diheptanoate
PTMG (MW600) di-2-ethylhexanoate
PEG/PPG equivalent mixture (MW600) diheptanoate Patent Document 6 indicates that an aliphatic carboxylic acid diester compound of polyalkylene glycol is used together with a metal salt of a sulfonic acid amide compound as a crystallization accelerator and mixed into a polyester resin. It is pointed out that the aliphatic carboxylic acid diester compound is used for a purpose opposite to that of the crystallization inhibitor of the present invention.

In addition, the difference between Patent Documents 3 and 4 and the present invention is described below. The general descriptions of these patent documents refer to XHNBR quaternary polymers; however, XHNBR ternary polymers are used in the Examples of each document. Moreover, these documents do not refer either to using an aliphatic carboxylic acid diester compound of polyalkylene glycol as a plasticizer. Moreover, in Patent Document 3, a fuel oil C immersion test of XHNBR ternary polymers is performed; however, the test is not performed using polycyclic aromatic compound-containing fuel oil.

The aliphatic carboxylic acid diester compound of polyalkylene glycol is used at a ratio of 4 to 31 parts by weight, preferably 4 to 30 parts by weight, more preferably 9 to 30 parts by weight, based on 100 parts by weight of the XHNBR quaternary polymer. When the ratio of the compound is less than this range, the effect of improving resistance to hardening caused by polycyclic aromatic hydrocarbons, which is the object of the present invention, is not obtained; whereas when the ratio is greater than this range, the effect of improving polycyclic aromatic compound-caused hardening resistance is also not obtained.

The nitrile content of the XHNBR quaternary polymer may be the nitrile content of an NBR-based polymer blend of two or more NBR-based polymers when they are used. Such a blend of two or more NBR-based polymers may be not only a blend of XHNBR quaternary polymers, but also a blend of a XHNBR quaternary polymer and a different NBR-based polymer, e.g., a XHNBR ternary polymer. In this case, the blending ratio of the XHNBR ternary polymer is about 30 wt. % or less.

The XHNBR quaternary polymer composition is prepared by suitably adding, in addition to the above components, other compounding agents that are generally used for NBR-based polymers, such as a reinforcing agent or filler (e.g., carbon black or white carbon), a lubricant, and a processing aid, and kneading the mixture using a closed kneader, a roll, or the like. The cure of the composition with a polyamine compound is performed, according to curing conditions of polyamine curable NBR, by press cure at about 100 to 200° C., preferably about 130 to 200° C., more preferably about 150 to 200° C., for about 30 seconds to 5 hours, preferably about 3 to 10 minutes, and optionally oven cure (secondary cure) at about 150 to 200° C. for about 0.5 to 24 hours.

As a reinforcing agent or a filler, white carbon is preferably used for coloring, which is intended to enhance visibility during production. As white carbon, at least one of silica, clay, diatomite, talc, barium sulfate, calcium carbonate, magnesium carbonate, calcium silicate, various colorless metal oxides, mica, and the like, is used in a range that does not impair rubber acidity. For example, white carbon is used at a ratio of about 10 to 200 parts by weight, preferably about 10 to 150 parts by weight, based on 100 parts by weight of the XHNBR quaternary polymer. Among these, silica having a specific surface area (BET method) of about 30 to 110 m$^2$/g, preferably about 30 to 60 m$^2$/g, is preferably used.

EXAMPLES

The following describes the present invention with reference to Examples.

Example 1

| | |
|---|---|
| XHNBR quaternary polymer (Zetpol 3700, produced by Zeon Corporation; CN content: 24%) | 100 parts by weight |
| Silica (Nipsil E75, produced by Tosoh Silica Corporation; specific surface area: 30 to 60 m$^2$/g) | 70 parts by weight |
| Polyoxyethylene alkyl ether phosphoric acid ester (Phosphanol RL-210, produced by Toho Chemical Industry Co., Ltd.; processing aid) | 1 part by weight |
| Hexamethylenediaminecarbamate (curing agent) | 3.6 parts by weight |
| 1,3-di-o-tolylguanidine (curing accelerator) | 1.75 parts by weight |
| PEG (MW: 300) di-2-ethylhexanoate (RS700, produced by Adeka Corporation) | 30 parts by weight |
| 4,4'-(α,α'-dimethylbenzoyl)diphenylamine (anti-aging agent) | 2 parts by weight |

Among the above components, the components other than the curing agent and curing accelerator were kneaded by a kneader, and then transferred to an open roll. After the curing agent and curing accelerator were added thereto and kneaded, press cure was performed at 180° C. for 10 minutes, and oven cure (secondary cure) was performed at 180° C. for 5 hours. The obtained curing product test pieces were measured for the following items:

[Test A] Polycyclic Aromatic Compound-Caused Hardening Resistance Test:

The curing product samples were immersed in a test solution prepared by dissolving 10 wt. % of phenanthrene in a Fuel C/EtOH mixture (Fuel C:EtOH=8:2 by volume ratio) [CE20] at 60° C. for 70 hours, then dried at 100° C. for 4 hours, and allowed to stand at room temperature for 24 hours. Then, the hardness (IRHD-M method) of the samples was measured.

Fuel C is an isooctane/toluene mixture (isooctane:toluene=5:5 by volume ratio).

The measured hardness was expressed as hardness changes (unit: pts), and their values were evaluated as follows:
- 15 pts or less: ◎
- 16 to 20 pts: ○
- 21 to 25 pts: Δ
- more than 26 pts: X

[Test B] Fuel Oil Swelling Resistance Test:
The volume changes of the curing product test pieces after they were immersed in a Fuel B/EtOH mixture (Fuel B:EtOH=74:26 by volume ratio) at 60° C. for 70 hours were measured.

Fuel B is an isooctane/toluene mixture (isooctane:toluene=7:3 by volume ratio).

The measured volume changes were evaluated as follows:
- +50% or less: ◎
- +51 to +60%: ○
- +61 to +64%: Δ
- +65% or more: X

[Test C] Low-Temperature Elasticity Recovery Test (TR Test):
The TR-10 (° C.) values were measured, and the measured values were evaluated as follows:
- −30° C. or less: ◎
- −25 to −29° C.: ○
- more than −25° C.: X Normal-State Physical Properties:
Hardness (type A durometer hardness, maximum value), tensile strength, and elongation at break were measured.

Compression Set:
The compression set value of an O ring (G25) was measured after it was allowed to stand at 120° C. for 70 hours.

Note that the production of the test pieces and the measurement methods in the above tests are based on JIS standards relating to cured rubber and thermoplastic rubber.

JIS K6250 2006 corresponding to ISO 23529: Rubber-General procedures for preparing and conditioning test pieces for physical test methods JIS K6253 1997 corresponding to ISO 48: Determination of hardness JIS K6258 2003 corresponding to ISO 1817: Determination of the effect of liquids JIS K6261 2006 corresponding to ISO 812: Determination of low temperature properties JIS K6251 2010 corresponding to ISO 37: Determination of tensile stress-strain properties JIS K6262 2006 corresponding to ISO 815: Determination of compression set at ambient, elevated or low temperatures JIS B2401 2012 corresponding to ISO 3601-1: O-rings

Examples 2 to 8, and Comparative Examples 1 to 6

In Example 1,
Zetpol 3610: XHNBR quaternary polymer (CN content: 21%)
Zetpol 2510: XHNBR ternary polymer (CN content: 36%)
Zetpol 2020: Hydrogenated NBR (CN content: 36.2%), and
Zetpol 3120: Hydrogenated NBR (CN content: 25%)
were used in combination with or in place of Zetpol 3700, which was quaternary XHNBR, and the amount of the plasticizer was changed in various ways.

Following Tables 1 and 2 show the results obtained in the above Examples and Comparative Examples, together with the amounts of the polymer and plasticizer used (unit: part by weight).

TABLE 1

| | Examples | | | | | | | |
|---|---|---|---|---|---|---|---|---|
| | 1 | 2 | 3 | 4 | 5 | 6 | 7 | 8 |
| [Polymer component] | | | | | | | | |
| Zetpol 3700 (quaternary) | 100 | 75 | 50 | 100 | 75 | 50 | 100 | 75 |
| Zetpol 3610 (quaternary) | | 25 | 50 | | 25 | 50 | | 25 |
| CN content (%) | 24 | 23.25 | 22.5 | 24 | 23.25 | 22.5 | 24 | 23.25 |
| [Plasticizer] | | | | | | | | |
| RS700 | 30 | 30 | 30 | 20 | 20 | 20 | 10 | 10 |
| [Physical property evaluation results] | | | | | | | | |
| Test A | | | | | | | | |
| Hardness changes (pts) | +20 | +19 | +18 | +14 | +13 | +14 | +9 | +7 |
| Hardness changes Evaluation | ○ | ○ | ○ | ◎ | ◎ | ◎ | ◎ | ◎ |
| Test B | | | | | | | | |
| Volume change rate (%) | +44 | +50 | +55 | +50 | +55 | +59 | +56 | +60 |
| Volume change rate Evaluation | ◎ | ◎ | ○ | ◎ | ○ | ○ | ○ | ○ |
| Test C | | | | | | | | |
| TR-10 (° C.) | −35 | −36 | −38 | −33 | −35 | −33 | −28 | −29 |
| TR-10 Evaluation | ◎ | ◎ | ◎ | ◎ | ◎ | ◎ | ○ | ○ |
| Normal-state physical properties | | | | | | | | |
| Hardness | 73 | 71 | 71 | 75 | 75 | 74 | 79 | 79 |
| Tensile strength (MPa) | 9.2 | 9.77 | 9.25 | 10.8 | 10.7 | 10.7 | 12.6 | 12 |
| Elongation at break (%) | 190 | 200 | 180 | 190 | 180 | 190 | 190 | 170 |
| Compression set (20° C., 70 hrs) (%) | 15 | 18 | 19 | 17 | 19 | 20 | 17 | 18 |

TABLE 2

| | Comparative Examples | | | | | |
|---|---|---|---|---|---|---|
| | 1 | 2 | 3 | 4 | 5 | 6 |
| [Polymer component] | | | | | | |
| Zetpol 3700 (quaternary) | 100 | | | | | |
| Zetpol 3610 (quaternary) | | 100 | 100 | | | |
| Zetpol 2510 (ternary) | | | | 100 | | |
| Zetpol 2020 | | | | | 100 | |
| Zetpol 3120 | | | | | | 100 |
| CN content (%) | 24 | 21 | 21 | 36 | 36.2 | 25 |
| [Plasticizer] | | | | | | |
| RS700 | | 30 | | 20 | 10 | 15 |
| [Physical property evaluation results] | | | | | | |
| Test A | | | | | | |
| Hardness changes (pts) | +0 | +15 | −8 | +28 | +27 | +16 |
| Hardness changes Evaluation | ◎ | ◎ | ◎ | X | X | ○ |
| Test B | | | | | | |
| Volume change rate (%) | +61 | +65 | +83 | +45 | +48 | +68 |
| Volume change rate Evaluation | Δ | X | X | ◎ | ◎ | X |
| Test C | | | | | | |
| TR-10 (° C.) | −23 | −42 | −28 | −28 | −34 | −33 |
| TR-10 Evaluation | X | ◎ | ○ | ○ | ◎ | ◎ |
| Normal-state physical properties | | | | | | |
| Hardness | 83 | 67 | 81 | 76 | 76 | 75 |
| Tensile strength (MPa) | 14.3 | 8.78 | 14.4 | 10.4 | 19.7 | 18.8 |
| Elongation at break (%) | 140 | 180 | 170 | 190 | 170 | 180 |
| Compression set (20° C., 70 hrs) (%) | 16 | 21 | 29 | 19 | 16 | 20 |

From the results shown in Tables 1 and 2, the present invention provides polyamine curable, highly saturated nitrile rubber compositions that exhibit resistant to hardening caused by polycyclic aromatic compounds and that have a hardness changes in Test A of 20 pts or less, preferably 15 pts or less, a volume change rate in Test B of +60% or less, preferably +50% or less, and a TR-10 value in Test C of −25° C. or less, preferably −30° C. or less.

The invention claimed is:

1. A method of using a cure molding material as a sealing material that is exposed to a polycyclic aromatic compound, comprising:
   providing a polyamine curable, highly saturated nitrile rubber composition having resistant to hardening caused by polycyclic aromatic compounds, which polyamine curable, highly saturated nitrile rubber composition comprises:
   100 parts by weight of a polyamine curable, highly saturated nitrile rubber having an α,β-ethylenically unsaturated nitrile monomer unit, a diene-based monomer unit, an α,β-ethylenically unsaturated dicarboxylic acid monoester monomer unit, and an α,β-ethylenically unsaturated carboxylic acid monomer unit other than the α,β-ethylenically unsaturated dicarboxylic acid ester monomer unit, and having an n α,β-ethylenically unsaturated nitrile monomer unit content of 22.0 to 24.5 wt. % and an iodine value of 120 or less; and
   4 to 31 parts by weight of an aliphatic carboxylic acid diester compound of polyalkylene glycol;
   forming a sealing material from the highly saturated nitrile rubber composition by cure molding the highly saturated nitrile rubber composition; and exposing the sealing material to a polycyclic aromatic compound.

2. The method of claim 1, wherein the polyamine curable, highly saturated nitrile rubber comprises an α,β-ethylenically unsaturated nitrile monomer unit content of 22.5 to 24.5 wt. %.

3. The method of claim 1, wherein the polyamine curable, highly saturated nitrile rubber comprises the α,β-ethylenically unsaturated carboxylic acid ester monomer unit other than the α,β-ethylenically unsaturated dicarboxylic acid ester monomer unit used together therewith, at a ratio of 30 wt. % or less in the polyamine curable, highly saturated nitrile rubber.

4. The method of claim 3, wherein the α,β-ethylenically unsaturated carboxylic acid ester monomer unit is at least one member of an acrylic acid alkyl ester monomer unit or methacrylic acid alkyl ester monomer unit having a $C_1$-$C_8$ alkyl group, an acrylic acid alkoxyalkyl ester monomer unit or methacrylic acid alkoxyalkyl ester monomer unit having a $C_2$-$C_8$ alkoxyalkyl group, and an α,β-ethylenically unsaturated dicarboxylic acid diester monomer unit.

5. The method of claim 1, wherein the aliphatic carboxylic acid diester compound of polyalkylene glycol is a compound represented by the general formula:

$$R^1COO(C_nH_{2n}O)_mCOR^2$$

wherein $R^1$ and $R^2$ are each independently a $C_1$-$C_{14}$ alkyl group or an alkenyl group, n is an integer of 2 to 4, and m is an integer of 2 to 30.

6. The method of claim 1, wherein the sealing material is used as an intake manifold gasket.

* * * * *